June 8, 1926.

C. BLUM

NONSLIPPING DEVICE FOR VEHICLE WHEELS

Filed Nov. 11, 1924

1,587,814

Inventor
Charles Blum

Patented June 8, 1926.

1,587,814

UNITED STATES PATENT OFFICE.

CHARLES BLUM, OF SURESNES, FRANCE.

NONSLIPPING DEVICE FOR VEHICLE WHEELS.

Application filed November 11, 1924, Serial No. 749,302, and in France February 22, 1924.

The present invention relates to a device serving to prevent the slipping of vehicle wheels comprising a disc which can be readily attached to the wheel and to which are pivoted a plurality of radial plates occupying a transverse position with respect to said wheel. The said plates can be brought towards the centre of the wheel when the device is inoperative, but are turned towards the periphery of the wheel when the vehicle is engaged upon slippery ground, so that the latter will be enabled to travel upon the said plates which extend outwardly of the wheel to a certain degree.

The said device which is both simple and effective, can be employed upon wheels with rigid or elastic tyres, but preferably upon wheels with pneumatic tyres.

The appended drawings, which are given by way of example show an embodiment of the said invention.

Figure 1:
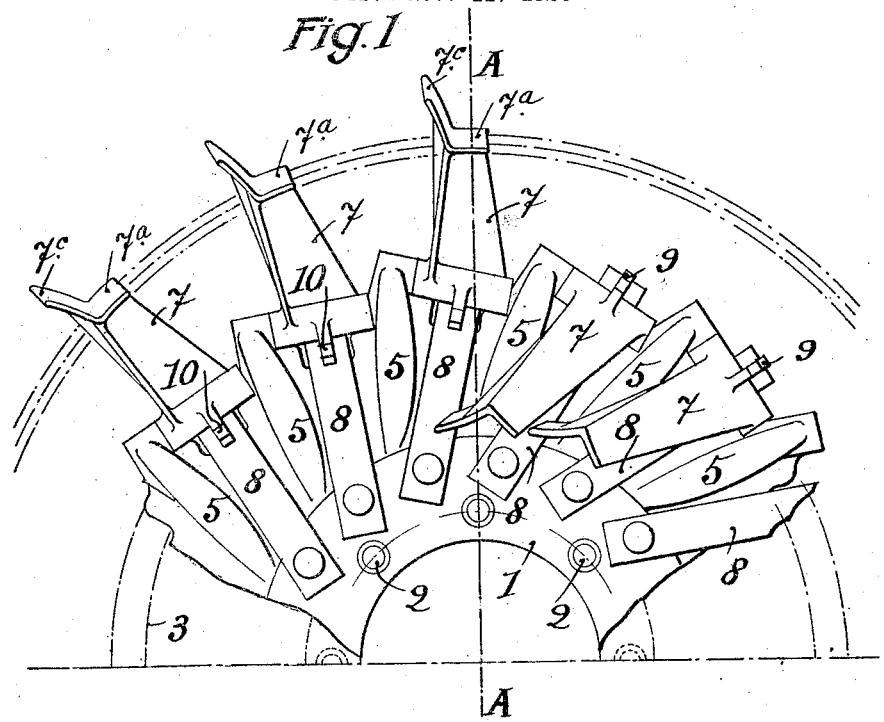
Fig. 1 is an elevational view of a portion of the device with various plates in the extended and in the lowered position.
Figure 2:
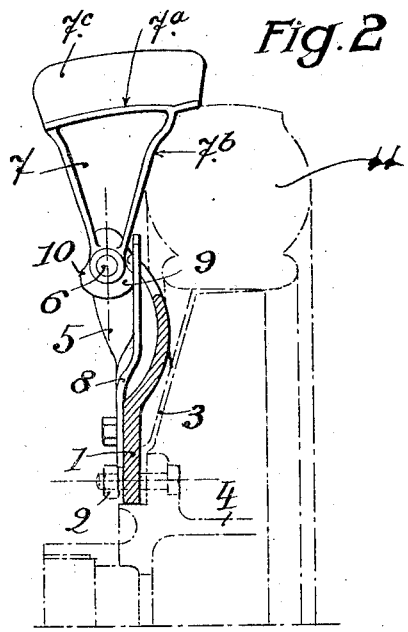
Fig. 2 is a vertical section on the line A—A of Fig. 1.

A steel disc 1 is secured for example by means of bolts 2 to the vehicle wheel 3 and the said bolts can also be employed to secure the wheel 3 to the hub 4. The disc 1 is provided with a series of bosses 5 serving as supports for the axes 6 which are approximately parallel to the plane of the wheel and about which are pivoted the plates 7.

In the operative position, the internal face 7$^b$ of the plate 7 bears upon the external face of the pneumatic tyre 11 or of the tyre or of the felly itself of the wheel; the sole 7$^a$ bears upon the ground and the wing 7$^c$ which extends outwardly of the periphery of the wheel acts as a cramp.

It is to be observed that due to the eccentricity of the pivots of the plates with respect to their axes and the inclination of the soles 7$^a$ with respect to the plane of the wheel, the forces acting upon the said plates and soles tend to apply the said plates against the tyre of the wheel.

Further, the soles 7$^a$ obviate the drawback that the plates 7 sink too much into the ground and serve also to compress the latter which thus constitutes a much more resisting fulcrum Each of the plates 7 is provided with two projections 9 and 10; a spring 8 secured to the disc 1 maintains the plate in the operative position when it bears upon the projection 9 and in the inoperative (or disappearing) position when it bears upon the projection 10.

When the vehicle is engaged upon slippery ground it will suffice to raise the said plates in succession in order to bring them towards the periphery of the wheel which is now provided with non-slipping projections constituted by the said plates and the vehicle will be enabled to travel and even to draw considerable loads over the worst ground. When arriving upon hard and firm ground, it is simply necessary to turn down the said plates in succession, bringing them towards the centre of the wheel and the vehicle will now travel in the ordinary manner.

The handling of the plates to bring them in the operative or inoperative position is very simple since it is not necessary to handle a nut, or key or a lock nor to add or to withdraw any piece, the device being complete by itself.

Should the vehicle be obliged to cover a long distance over ground upon which it is certain that the non-slipping device will not be required, the same may be entirely removed (although it is not necessary) by taking off the bolts 2 and then screwing them in place after removing the said plates, in order to hold the wheels upon the hubs.

Obviously it will be feasible to suitably modify the form and arrangement of the several parts of the said device which is given by way of example, without departing from the spirit of the invention, and in particular, suitable means can be provided for the automatic operation of the plates.

Having thus described my apparatus, what I claim as new therein, and my own invention, is:

1. In a non-slipping device for vehicle wheels, the combination of a disc adapted to be easily attached to and detached from the hub of the wheel of the vehicle, radial plates pivoted to the side of said disc and adapted to be raised or turned to the outside towards the operative position and to be turned down towards the center of the said wheel, axes of oscillation secured to the said disc and adapted to receive the said plates, the said axes being parallel to the plane of the said wheel, a cam with two bosses upon each of said plates, a flat spring fixed to the said disc, this spring being adapted to cooperate with the said cam for the purpose of maintaining alternatively the said cam in the operative and in the inoperative position.

2. In a non-slipping device for vehicle wheels the combination of a disc adapted to be easily attached to and detached from the hub of the wheel of the vehicle, radial plates pivoted to the side of the said disc and adapted to be raised or turned to the outside towards the operative position and to be turned down towards the center of the wheel, axes of oscillation secured to the said disc and adapted to receive the said plates, the said axes being parallel to the plane of the said wheel, the said axes being located in such a manner that in the operative position of the said plates, the fulcrum of each plate upon the ground will be situated between the middle plane of the wheel and the plane passing through the axes of oscillation by means of which the said plates are pivoted to the said disc so that the weight of the vehicle will tend to press the plates against the tyre of the wheel and that the latter will thus be maintained automatically in the operative position.

3. In a non-slipping device for vehicle wheels, the combination of a disc adapted to be easily attached to and detached from the hub of the wheel of the vehicle radial plates pivoted to one side of the said disc and adapted to be turned to the outside towards the operative position and to be turned down towards the center of the said wheel, axes of oscillation secured to the said disc and adapted to receive the said plates the said axes being parallel to the plane of the said wheel, the bearing base of each one of the said plates being inclined so that in the operative position the weight of the vehicle will produce an oblique reaction in the direction of the said wheel, this reaction tending to press the plate against the tyre of the wheel and to thus maintain the same automatically in the operative position.

In testimony that I claim the foregoing as my invention, I have signed my name.

CHARLES BLUM.